(12) United States Patent
Springer et al.

(10) Patent No.: US 8,342,123 B2
(45) Date of Patent: Jan. 1, 2013

(54) MILK COLLECTING DEVICE AND METHOD FOR OPERATING A MILK COLLECTING DEVICE

(75) Inventors: Andreas Springer, Beckum (DE); Otto Krone, Laggenbeck (DE)

(73) Assignee: GEA Farm Technologies GmbH, Bönen (DE)

(*) Notice: Subject to any disclaimer, the term of this patent is extended or adjusted under 35 U.S.C. 154(b) by 983 days.

(21) Appl. No.: 12/225,452

(22) PCT Filed: Mar. 22, 2007

(86) PCT No.: PCT/EP2007/002552
§ 371 (c)(1),
(2), (4) Date: Nov. 21, 2008

(87) PCT Pub. No.: WO2007/110190
PCT Pub. Date: Oct. 4, 2007

(65) Prior Publication Data
US 2009/0165726 A1 Jul. 2, 2009

(30) Foreign Application Priority Data
Mar. 25, 2006 (DE) .......................... 10 2006 014 207

(51) Int. Cl.
*A01J 1/00* (2006.01)
(52) U.S. Cl. .................................................... 119/14.02
(58) Field of Classification Search ............... 119/14.02, 119/14.08, 14.14, 14.17
See application file for complete search history.

(56) References Cited

U.S. PATENT DOCUMENTS 1,820,981 A * 9/1931 Le Fever ....................... 137/392
3,469,596 A 9/1969 Branton
(Continued)

FOREIGN PATENT DOCUMENTS
DE 2 236 472 6/1973
(Continued)

OTHER PUBLICATIONS

English language Translated Description and Claims of DE 30 05 489 A1, European Patent Office's esp@cenet.com database, 2pp.
(Continued)

*Primary Examiner* — Richard Price, Jr.
(74) *Attorney, Agent, or Firm* — Smith Law Office (57) ABSTRACT

The invention relates to a milk collecting device and a method for operating a milk collecting device, comprising a milk collecting vessel with an inlet and a controllable outlet and a measuring device, said measuring device comprising a first electrode and a second electrode at a separation from the first electrode, a power supply electrically connected to both electrodes and a measuring device for recording an electrical parameter. The power supply is connected to two connection points on the first electrode at a separation from each other such as to be in parallel with relation to the first electrode and connected to the second electrode by the measuring device in order to determine a characteristic measure for the filling level of a liquid in the milk collecting vessel.

31 Claims, 2 Drawing Sheets

U.S. PATENT DOCUMENTS

| | | | |
|---|---|---|---|
| 4,433,577 A * | 2/1984 | Khurgin et al. | 73/290 V |
| 4,452,176 A * | 6/1984 | Hoefelmayr et al. | 119/14.17 |
| 4,480,484 A * | 11/1984 | Ueyama | 73/861.08 |
| 4,485,762 A * | 12/1984 | Sutton et al. | 119/14.17 |
| 5,313,833 A * | 5/1994 | Hoefelmayr | 73/215 |
| 5,487,359 A * | 1/1996 | Montreuil | 119/14.17 |
| 5,792,964 A * | 8/1998 | van den Berg | 73/861.15 |
| 5,873,323 A * | 2/1999 | van den Berg et al. | 119/14.02 |
| 7,992,450 B2 | 8/2011 | Springer et al. | |
| 2002/0148408 A1* | 10/2002 | Gompper et al. | 119/14.14 |
| 2003/0019431 A1* | 1/2003 | van den Berg et al. | 119/14.02 |
| 2007/0113790 A1* | 5/2007 | Akerman | 119/14.02 |
| 2008/0006210 A1* | 1/2008 | Springer et al. | 119/14.14 |
| 2011/0132264 A1* | 6/2011 | Akerman | 119/14.08 |

FOREIGN PATENT DOCUMENTS

| | | |
|---|---|---|
| DE | 30 05 489 A1 | 8/1981 |
| DE | 32 26 022 A1 | 3/1983 |
| EP | 1067368 | 7/1999 |
| EP | 1 067 368 A1 | 1/2001 |
| GB | 1 348 967 | 3/1974 |
| WO | WO 99/45344 | 9/1999 |

OTHER PUBLICATIONS

English language Abstract, Translated Description and Claims of DE 32 36 022 A1, European Patent Office's esp@cenet.com database, 4pp.

English language Abstract, Translated Description and Claims of EP 1 067 368 A1, European Patent Office's esp@cenet.com database, 4pp.

PCT/IB/338, Notification of Transmittal of Translation of the International Preliminary Report on Patentability, 1 p.

PCT/IB/373, International Preliminary Report on Patentability, 1p.

PCT/ISA/237, Written Opinion of the International Searching Authority (Translated), 5pp.

English Translation of EP1067368, Publication Date: Jul. 8, 1999.

\* cited by examiner

MILK COLLECTING DEVICE AND METHOD FOR OPERATING A MILK COLLECTING DEVICE

The present invention relates to a milk collecting device and a method for operating a milk collecting device, and to an exchangeable measuring module for a milk collecting device and a milking installation equipped therewith. The invention will now be described with respect to its application in milking installations for the milking of cows. The invention can, however, also be applied in milking installations for milking other lactating mammals such as in particular in milking installations for milking sheep, goats, buffaloes, llamas, camels, dromedaries, and the like.

A milk collecting device according to the invention may be employed in milking installations for conventional milking, in milking installations for machine milking, and also in installations for semi- or fully automatic milking. Application is also conceivable in systems where the teat cups are placed to the animal teats semi-automatically or fully automatically or robot-assisted and/or computer-controlled.

In the milking installations known from the prior art, milk is stored at least temporarily in the vacuum section of the milking installation in a milk collecting vessel of a milk collecting device from where it is conveyed through a milk pump into a milk cooling tank in which normal pressure prevails. The milk collecting device with the milk separator and the milk pump forms the end unit. This is the boundary between the part of the milking installation under operating vacuum and the part of the milking installation under normal atmospheric pressure, which also includes the milk cooling tank for cool storage of the milk until it is collected e.g. by a milk collecting truck.

The milk flows from the milk pipeline or the milking line into the milk collecting vessel. In the prior art, the filling level is captured in said vessel e.g. via a level switch configured as a float switch which, as a specific filling level is reached in the collecting vessel, emits a signal by means of which the milk pump is activated to evacuate the milk collecting vessel. Deactivating the milk pump is provided either by way of a pre-set time or by another level switch which emits a corresponding signal as the milk collecting vessel is nearly empty.

As a rule the gas volume remaining with the milk serves as a vacuum reservoir to the milking installation, aiding in keeping down any pressure fluctuations due to additionally entering air as occurs for example when a milking unit is knocked off. In this way, vacuum fluctuation prior to vacuum pump response is reduced.

Since the level in the milk collecting vessel will keep fluctuating between the maximum and the minimum, the buffer volume will vary correspondingly such that in dependence on the filled quantity, any additionally air infiltration will affect the vacuum level in different ways.

The prior art provides that other than the float switches indicated above for capturing the liquid level in a milk collecting vessel, contact electrodes may be employed which emit a contact signal as they are wetted with a liquid. The conventionally employed electrodes may involve the problem that they may possibly detect a filling level, which is in fact not present, in the case of contact not with liquids but also with froth. This may result in malfunction of the milk conveying device if the milk pump runs empty.

When float switches are employed, a moving component is located directly in the milk collecting vessel which, due to foreign bodies or other contamination or the like may malfunction. Furthermore, both the electrode solution and the float solution involve a two-position control which can only operate the states "PUMP ON" or "PUMP OFF". To expand this function, additional electrodes or a float rod having more than two switches or an additional float rod must be used. This makes the equipment considerably more complex and also more error-prone.

It is therefore the object of the present invention to provide a milk collecting device and a method for operating a milk collecting device which allow to reliably measure the filling level. Preferably any parts which are moving and thus particularly subjected to wear should be omitted in the interior of the milk collecting vessel. It is ultimately preferable to also prevent or minimize the risk of misinterpretation of froth.

The object is solved by the subject matters of the independent claims 1, 16, 20, and 23. Preferred embodiments and more specific embodiments are the objects of the subclaims.

The milk collecting device according to the invention comprises at least one milk collecting vessel with at least one inlet and at least one controllable outlet, and at least one measuring apparatus. The measuring apparatus comprises at least a first electrode and at least a second electrode spaced apart from said first electrode, and a power supply electrically connected with the two electrodes and a measuring device for capturing at least one electric parameter. Said power supply is connected to two spaced apart connection points of the first electrode so as to be connected in parallel relative to the first electrode. Furthermore the power supply is connected with the second electrode via the measuring device in order to determine a characteristic measure of the filled quantity of a liquid present in the milk collecting vessel or of a liquid/froth mixture present in said milk collecting vessel. This means in particular that the measuring device is series-connected with the second electrode relative to the power supply.

The invention has many advantages. Thus, no moving part is provided in the measuring apparatus. Due to this principle the measuring apparatus cannot fail due to jammed slideways, which will make measuring more reliable and prevent malfunction. It is furthermore advantageous for measuring to occur over extended electrode surfaces, not in points as has been the case in the prior art. Wetting with froth is not sufficient for feigning to the installation that a milk collecting vessel is entirely filled with liquid milk. However, froth will be measured corresponding to the density fraction.

Preferably at least one milk separator is provided which is connected with the milk collecting vessel via a line. The milk separator is in particular positioned above the milk collecting vessel and serves to separate fluids to keep any liquid droplets away from the subsequent vacuum pump.

Furthermore, preferably at least one milk pump is provided which is in particular connected with the outlet of the milk collecting vessel. The milk pump is in particular immediately connected with the outlet of the milk collecting vessel. Thus the milk pump is preferably connected directly with the outlet spout. While the outlet is advantageously placed at the lowest position, it may be inserted from above into the milk collecting vessel via a pipe or a hose or the like, extending down to the lower end.

In all of the embodiments the milk pump outlet is preferably provided in the atmospheric section of a milking installation where the ambient pressure remains at approximately 1 bar during milking. The milk collecting vessel, however, is preferably provided in the vacuum section of a milking installation, being at operating vacuum during milking.

The milk pump is provided for pumping the subpressurized milk out of the milk collecting vessel and for compressing it to normal pressure to supply the milk to a bulk milk tank.

In this configuration the milk collecting device in conjunction with the milk separator and the milk pump serves as the end unit.

The milk collecting vessel is in particular dimensioned so as to receive milk from more than one animal such that in particular it comprises a volume larger than the typical milk yield of an animal to be milked.

Preferably a buffer volume is provided to increase the steadiness of the vacuum during milking. For example if a teat cup is knocked off, the buffer volume will reduce the effect on the steadiness of the vacuum such that the vacuum level will change but slightly. Preferably the buffer volume is formed by the free volume in the milk collecting vessel.

The measuring apparatus is preferably elongated in shape and it is in particular substantially configured rod-like. By way of elongated electrodes a wide measuring range can be covered at high accuracy.

The electrodes preferably extend in a longitudinal direction of the measuring apparatus substantially parallel to one another. Retaining means are provided to retain the electrodes at a predetermined distance from one another.

In all of the configurations at least one retaining means is provided with at least one opening which is in particular configured as a beaded edge.

In all of the embodiments the power supply is preferably configured as a voltage supply wherein in particular an alternating voltage is applied. Or else, the power supply may be configured as a current supply and in particular as a constant current supply.

In another preferred embodiment at least one electrode extends over the entire height or at least nearly the entire height of the measuring apparatus. Preferably the electrodes extend over a major portion of the height of the milk collecting vessel. In this way, filling levels can be captured over the largest possible measuring range.

All of the embodiments preferably provide a processor device which with the aid of the measuring device determines a first quantity of fluid at a first predetermined time and at least one second quantity of fluid at a second time. For storing the measured values a storage device may be provided.

By means of the invention, filling level measurement can be realized in a measuring device in that potentiometric measuring is carried out. To the first electrode, a potential is applied which linearly drops over the length of the electrode, which linear drop will in particular occur when the cross-section and the material properties remain constant over the length of said electrode. When, in measuring up to a certain level, said first electrode is wetted with a frothing liquid, wetting occurs both with the liquid phase and with any froth phase which may be present. Therefore, a potential curve is introduced into the fluid depending on the height and the quality of wetting. The power supply is in particular connected with two connection points spaced far apart of the first electrode such that it is connected in parallel to the first electrode. The two spaced-apart connection points of the first electrode may be positioned in particular at two ends of the first electrode.

As set forth, what is measured is not the resistance or impedance between the electrodes but preferably the potential. The potential is then introduced into the fluid to be measured by the first electrode. Where both electrodes are covered in pure liquid from bottom to top, the first electrode will apply to the liquid a gliding potential for example between 0 and 60 mV. In the case of a locally homogeneous liquid between the electrodes one will thus measure an integral mean value of 30 mV between the two electrodes. With both electrodes wetted up to half their heights, a potential gliding above the height of the electrode between 0 and 30 mV is applied. An integral potential of 15 mV will be measured between the two electrodes.

Where a layered fluid is present, i.e. a fluid comprising both a liquid and a frothing portion or different phases in general, the measuring apparatus according to the invention permits measuring of liquids laced with froth wherein corresponding to the respective density the corresponding proportion is taken into account such that the quantity is captured, not only the filling level.

The present invention provides the possibility of determining the filling level of a foamy and/or foam-producing liquid such as milk. What is also possible is measuring the filling levels of other liquids such as in particular the filled quantity of cleaning and/or disinfectant liquids when cleaning the apparatus so as to control the cleaning program accordingly.

Since the apparatus according to the invention does not comprise any moving parts, it offers ease of cleaning, disinfection, and maintenance. Also, the structure of a corresponding measuring housing may be very simple.

The measuring principle according to the invention allows accurately measuring the filling level in a wide measuring range from low to high filling levels without having to perform calibration with the actual fluid to be measured. The accuracy of measuring is not related to the conductivity of the liquid if only minimum conductivity is present which is given as a rule even for simply distilled water and thus all the more for tap or well water, milk, etc. Thus the conductivity of milk, common tap water and other liquids lies within a range well suited for measuring.

Additionally, measuring is largely independent of the temperature and the pressure in the measuring vessel.

Preferably the electrodes are configured such that their inherent resistance or impedance is considerably lower than the impedance of the liquid phase of the fluid to be measured. This will ensure a "linear" potential curve above the height of the first electrode, independently of the fill height of the liquid phase or the froth portion.

Advantageously the impedance between the first and the second end of each electrode is considerably smaller than the impedance between the electrodes at maximum level of the liquid phase of the fluid. This will ensure that the electric potential forming around the electrode will not be significantly affected by the fluid. In this way the measuring accuracy is enhanced. For example an electrode having an electrical impedance of 100 milliohms may be employed. Higher and lower values are also possible.

Preferably the measuring apparatus is substantially rod-like in shape. In this way the measuring apparatus can be readily inserted into milk collecting vessels through openings.

Particularly preferably at least one electrode is configured as a conductive rod designed in particular round, oval, triangular, quadrangular or polygonal, or flat, or curved. One or both of the electrodes may be configured as hollow profiles so as to allow e.g. an internal cable feed.

In another preferred embodiment the electrodes extend substantially parallel relative to one another in a longitudinal direction of the measuring apparatus. Such parallel configuration allows a particularly convenient evaluation of the potential curves.

Preferably one or more retaining means are provided to retain the electrodes at a predetermined distance from one another. A retaining means may be configured e.g. as a rubber plug comprising two openings in which the two electrodes are guided and retained spaced apart from one another.

In another preferred embodiment at least one retaining means is provided with an opening. Through such opening the liquid may exit from the measuring apparatus for example while the milk collecting vessel is emptied.

Particularly preferably the power supply is a voltage supply. It is also possible to employ a current supply. In the case of a current supply, it will preferably be a constant current supply.

Preferably the electrical magnitude applied in parallel to the first electrode will be an electrical voltage. By means of the voltage supply, an electrical voltage is applied between the first end and the second end of the first electrode. Accordingly the measuring device in this embodiment comprises a voltage measuring means.

It is advantageous that for measuring, the voltage supply applies a voltage in the range of millivolts, in particular in a range up to approximately 100 mV, preferably values up to approximately 5 mV, 10 mV, 20 mV, 30 mV, 40 mV, 50 mV, or 60 mV. At this point reference is made to that larger or smaller, in particular larger potentials may be employed. In the case that any transmission of potential to animals or humans can be ruled out, potentials of several hundred millivolts or else several volts may be applied. Generally speaking, somewhat higher potentials facilitate evaluation.

Preferably the voltage supply generates an alternating voltage to protect the electrodes from wear, and to prevent electrolytical residue which might cause errors in the measuring results. The frequencies of the alternating voltage preset by the voltage supply will be in an adequate range wherein for example a frequency of 1 kHz, or else other frequencies, are possible.

Particularly preferably the voltage measuring means comprises a high internal impedance which internal impedance is preferably considerably higher than the electrical impedance typical of the liquid to be examined between the first and the second electrode at minimum level.

Measuring is also conceivable where instead of the voltage supply, a (constant) current supply is used wherein a current sensor is then provided instead of the voltage measuring means, the electrical magnitude being electric current.

With the latter configuration it should be noted that impedance will change with temperature. This means that if a constant current supply is used, it should compensate for any varying voltage drops. Preferably a temperature sensor is positioned to capture the temperature of the liquid or of the electrode.

The measuring signal is preferably captured at specific, predetermined or selectable time intervals such that quasi continuous measuring will be present.

In another preferred embodiment at least one retaining means is provided as a beaded edge or comprises a beaded edge. The ends of the electrodes will be put inside said beaded edge which edge comprises an outlet opening. In the case of very low filling levels in the milk collecting vessel this embodiment still allows detection of a potential.

In a preferred embodiment of the invention a processor device is provided which with the aid of the measuring device determines a first fluid quantity or a filling level at a first predetermined time and a second fluid quantity at a second predetermined time. By way of said determining it is also possible to measure the outlet speed or the inlet speed or a resulting outlet or inlet speed.

The measuring module according to the invention is in particular exchangeable and is provided to be employed in a milk collecting device of a milking installation. The measuring module according to the invention comprises a measuring apparatus for determining the filled quantity in a milk collecting device. The measuring apparatus comprises a housing with a retaining device at which at least one first electrode and a second electrode spaced apart from said first electrode is received, wherein a power supply electrically connected with the two electrodes, and a measuring device for capturing at least one electrical parameter is provided. Said power supply is connected to two spaced-apart connection points of the first electrode so as to be connected in parallel relative to the first electrode, and connected with the second electrode via the measuring device to determine a characteristic measure of the filled quantity of a liquid present in the milk collecting vessel.

The measuring module is in particular provided to be employed in the milk collecting device described above. Advantageously the measuring module is configured so as to allow retrofitting existing installations originally equipped for example with a float switch. Preferably at least one retaining device is configured as a rubber plug. The rubber plug may, other than the retaining function, also perform a sealing function at the milk collecting vessel when the measuring module is inserted in the milk collecting device from the exterior. Since during operation an internal operating vacuum is present, sealing against the ambience is required which may be provided by a rubber plug or a plug of a similar, elastic material.

In all of the embodiments at least one electrode may be configured as a hollow rod. Then the feed line may be guided toward an end in the interior of the hollow rod. In particular the first electrode is configured as a hollow rod and contacted at the lower end, with the associated feed line being guided upwardly in the interior of the hollow rod.

The milking installation for milking animals according to the invention is equipped with a milk collecting device having a milk collecting vessel with at least one inlet and at least one controllable outlet, and with a measuring apparatus. The measuring apparatus comprises at least a first electrode and at least a second electrode spaced apart from said first electrode, and a power supply electrically connected with both electrodes and a measuring device for capturing at least one electrical parameter. Said power supply is connected to two spaced apart connection points of the first electrode so as to be connected in parallel relative to the first electrode, and connected with the second electrode via the measuring device to determine a characteristic measure of the filled quantity of a liquid present in the milk collecting vessel.

Preferably at least one processor device is provided which time-controls the milking operation as a function of the characteristic measure of the filled quantity.

The milking installation may be equipped with a semi-automatic or fully automatic or robot-controlled placing system and it may be configured as a single stand or multiple stand installation.

The inventive method for controlling the operation of a milk collecting device is carried out by means of a measuring device and a milk collecting vessel, wherein a liquid, in particular milk or a cleaning liquid, is conveyed into the milk collecting vessel. By means of a power supply an electrical parameter is applied to a first electrode immersed in said liquid at least in part, and between the first and a second electrode an electrical signal is captured which is evaluated by means of a measuring device located between the first and second electrodes. Said power supply is connected to two spaced apart connection points of the first electrode so as to be connected in parallel relative to the first electrode, and connected with the second electrode via the measuring device wherein a characteristic measure of the filled quantity of a liquid present in the milk collecting vessel is derived.

The method according to the invention in particular provides for an outlet of the milk collecting vessel to be controlled in dependence on the filled quantity in the milk collecting vessel. To this end a milk pump is controlled.

Preferably a measure of the fluid flow entering per unit time is derived.

In all of the configurations the milk pump is preferably controlled such that the rotational speed of the milk pump is controlled in dependence on the entering fluid flow which rotational speed is in particular frequency-controlled.

The milk pump is in particular controlled such that a considerable buffer vacuum is present in the milk collecting vessel to maintain the milking vacuum in the system at the most constant level possible. The buffer vacuum is in particular maintained at between 25 and 75% of the milk collecting vessel volume so as to provide an adequate volume. A 50% fraction is in particular sought. In this way a constant buffer volume is provided which allows more consistency in the milking conditions as well as cleaning conditions.

Preferably the fluid flow entering the milk collecting vessel is incorporated to form one fluid quantity.

In dependence on the milk flow and the obtained milk yield a signal may be emitted to a refrigerating system. This may be e.g. the quantity of milk already present so as to control the refrigeration unit in good time.

Controlling the milking process is conceivable as well.

While the installation is being cleaned with cleaning fluid, it is preferably operated using switching points or filling levels different from those employed during milking.

In all of the cases, the detected electrical signal is captured in particular at least at two different points in time. The method according to the invention allows to determine the filling level of a liquid present in a milk collecting vessel. The signal captured at least at two different times preferably serves to determine a flow rate of the liquid, i.e. as indicated above, an outlet rate, an inlet rate, or a resulting outlet or inlet rate.

The distance between the first electrode and the second electrode is at least slight but it may in particular be considerable. An electrode may for example be located in, or formed by, the wall of the milk collecting vessel. Or else it is conceivable that both electrodes are located at or incorporated in opposite walls of the milk collecting vessel.

Further advantages and embodiments can be taken from an exemplary embodiment described below with reference to the enclosed figures.

These show in.

Figure 1:
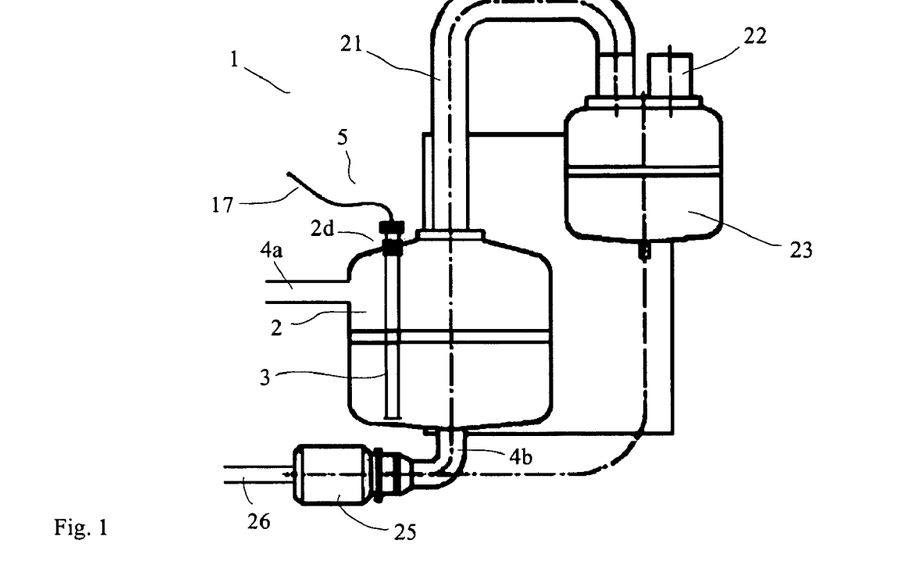
FIG. 1 an inventive milk collecting device of a milking installation with an inventive measuring apparatus.

FIG. 1 shows a detail of a milking installation with a milk collecting device 1 according to the invention equipped with a measuring apparatus 3 according to the invention. The reference numeral 23 relates to a so-called milk separator connected with a vacuum pump (not shown) via a connection 22.

The function of the milk separator 23 is to prevent liquids from entering the vacuum pump.

The milk separator 23 is directly connected with a milk collecting vessel 2 located beneath the milk separator 23, via a line 21. Beneath the milk collecting vessel 2 a milk pump 25 is located to suction off the milk from the milk collecting vessel 2 downwardly as the filled quantity in the milk collecting vessel 2 exceeds a predetermined or adjustable height.

The reference numeral 4a is a feed line through which the obtained milk is conveyed into the milk collecting vessel 2.

Inside the milk collecting vessel 2 there is located a measuring apparatus 3 configured as an exchangeable measuring module 5. In the embodiment shown in FIG. 1 said measuring apparatus 3 extends substantially along the entire height of the milk collecting vessel 2. To this end the measuring apparatus 3 can be inserted through an opening in a top element of the milk collecting vessel 2. The reference numeral 17 is an electrical connection line for the measuring apparatus.

Figure 2:
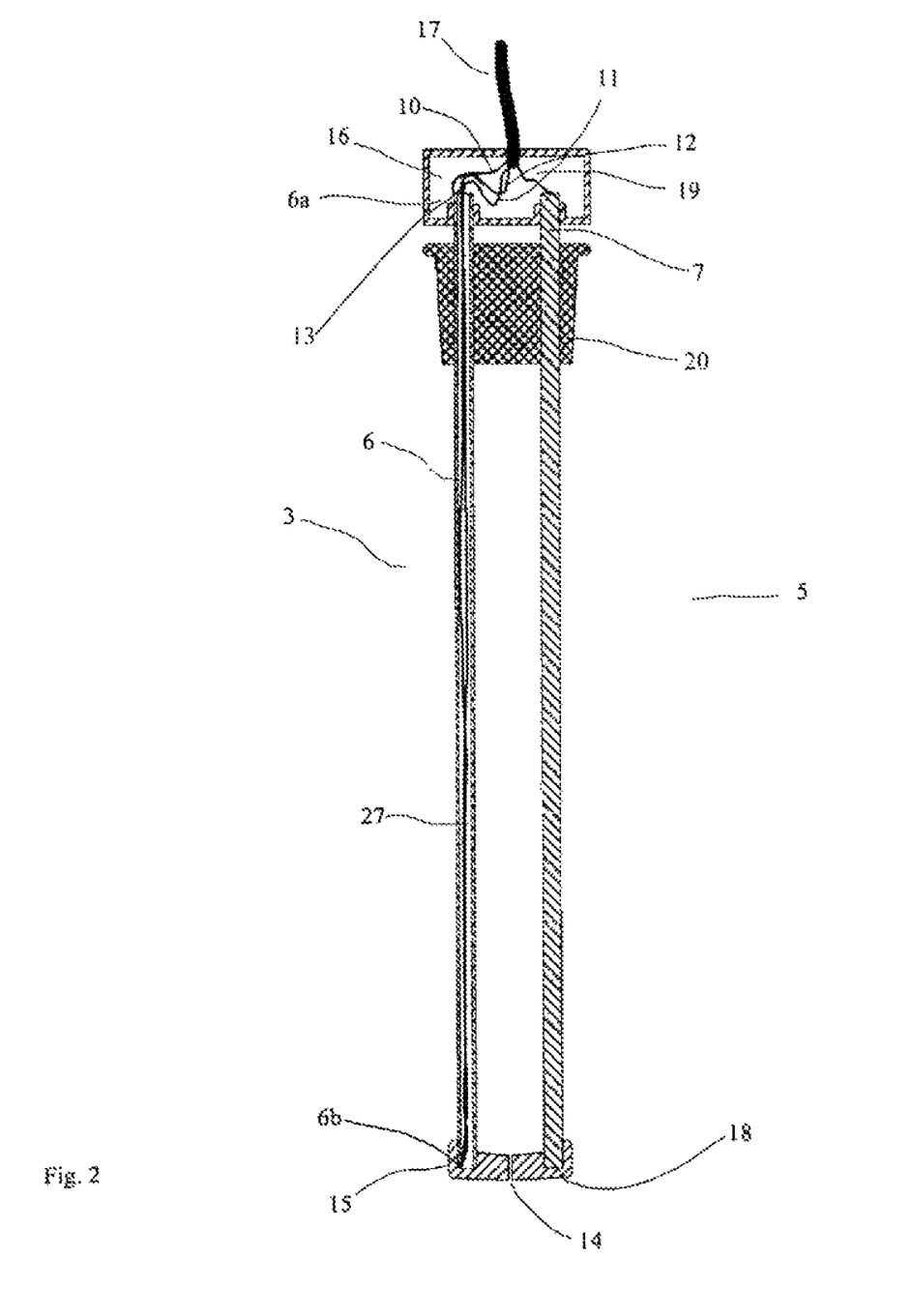
FIG. 2 an illustration of an inventive measuring module.

FIG. 2 shows a schematic illustration of an inventive, exchangeable measuring module 5 with a measuring apparatus 3. Said measuring apparatus 3 comprises a first electrode 6 and a second electrode 7. In the embodiment presently shown the first electrode 6 consists of a tube of an electrical material having a clear diameter of e.g. approximately 3, 5, or 7 mm and a wall thickness of 0.5 mm or 1 mm. Clearly different dimensions are conceivable as well. The second electrode 7 also consists of an electrically conductive material and it may be formed of a solid material at a diameter of approximately 10 mm. The two electrodes 6 and 7 are retained at a predetermined distance from one another by way of a rubber plug 20. However, it is also conceivable to provide multiple, similar electrodes instead of the illustrated electrode 7 (or 6). The electrode 7, or 6, may be incorporated in the vessel wall 2c.

The rubber plug 20 is inserted into an opening 2d in the collecting vessel 2 shown in FIG. 1. The reference numeral 16 refers to a cable connection in the interior of which each of the electrical lines 10, 11, 12, 13, and 19 is guided toward the electrodes 6 and 7.

More precisely, the lines 10 and 11 are applied to the connection point 6a and the lines 12 and 13, to the connection point 6b of the first electrode. Preferably the top connection point 6a is located at or above the height of the maximum filling level obtainable inside the milk collecting vessel and the bottom connection point, at or near the bottom of the milk collecting vessel 2.

The first electrode 7 is provided with an electrical line only at its top end. However, multiple electrical lines 10, 11, 12, and 13 run toward the electrode 6. The lines 10 and 11 are guided to the top end 6a of the first electrode 6 and the lines 12 and 13, to the bottom end 6b. This wiring scheme will be explained below in more detail with reference to the equivalent circuit diagram.

Other configurations may provide for a connection of the first electrode with two lines only. Then for example line 10 may be connected with the connection point 6a and line 13, with the connection point 6b while lines 11 and 12 are absent. However, four connections allow to obtain higher precision than two connections since with only two connections, measuring errors may occur in the lines such that preferably four lines are employed.

At what are the bottom ends of the first and the second electrodes 6 and 7, a retaining device 15 is arranged. Said retaining device 15 comprises recesses 18 into which the ends of the electrodes 6 and 7 can be inserted. Additionally an opening 14 is provided through which any residual liquid may be drained.

In the embodiment shown in FIG. 2 the two electrodes 6 and 7, retained by the rubber plug 20 and the retaining device 15 and inserted into the milk collecting vessel 2 without any other housing. However it would be possible to additionally provide a housing in which the two electrodes 6 and 7 are located for example to offer better protection from kicks. Such housing may comprise for example one or more slitted openings for milk to enter the clearance between the first electrode 6 and the second electrode 7.

As indicated initially, the measuring apparatus according to the invention allows to measure the filled quantity, not only the filling level. The measurement result is not dependent on the conductance of the liquid, and not on any froth formation.

Figure 3:
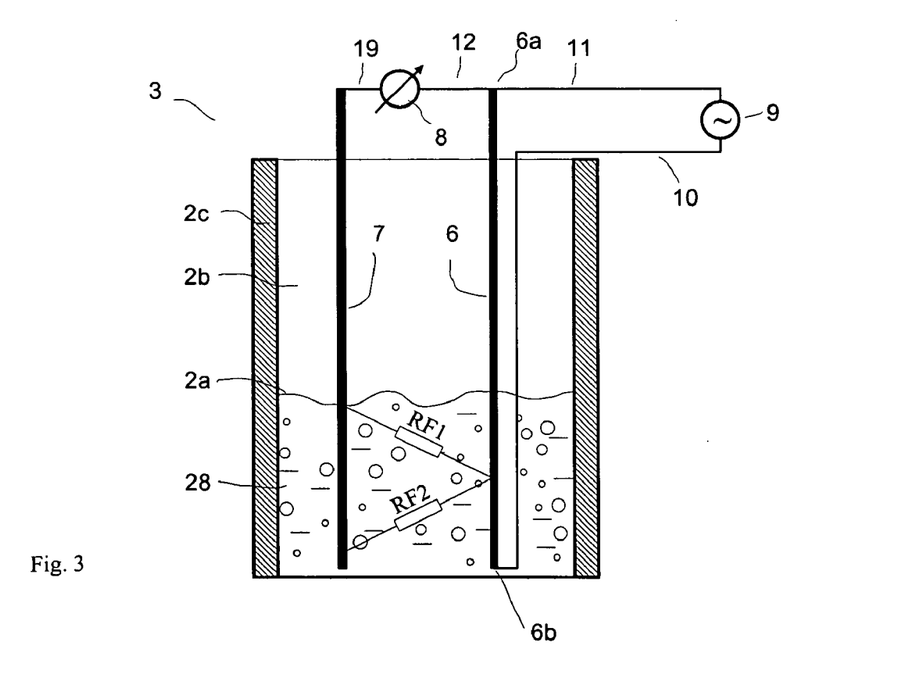
FIG. 3 a schematic equivalent circuit diagram of an inventive measuring apparatus.

The embodiment shown in FIG. 3 is a potentiometric filling level sensor to solve the basic problems of the invention such as relation to froth and employing moving parts, and a smaller number of switching points, while concurrently allowing a plurality of new applications such as data acquisition and system control.

When employing a milk pump controlled via two switching points (with maximum-minimum control), said switching points can be adjusted very easily and precisely without requiring any mechanical actions. Any froth that may be present in the collecting vessel has no effect on any of the switching actions since what is detected is the filled quantity. The switching points can be individually adjusted in each system. Self-adjustment is also conceivable. There is no need to provide float switches or contacts at different heights. The switching point can be flexibly changed at any time.

When employing a milk pump controlled via one switching point only and for example registering a maximum filled quantity, including the time required for draining, any influence by the froth on switching may be neglected and in this way the risk of the pump running dry is minimized. As a rule, however, the present invention does not perform time control since the currently filled quantity can be precisely retrieved at any time such that the milk pump can be turned off at a suitable time.

In the case that the conveyed quantity per unit time of the milk pump including hydraulic conditions during starting and stopping the pump is known, specifics of the conveyed milk quantity and thus of the bulk tank content may be delivered. If the milk collecting vessel is employed for one milking stand only, e.g. in a robotic milking installation of one box only, milk yield control may be performed and even the milking process may be controlled via the filled quantity signal, in particular with the milk collecting vessel being of a sufficient size to receive the entire milk of one milking process.

To enable optimal precooling by means of the plate cooler, the filling level signal of the collecting vessel may be employed for example for changing the rotational speed of the milk pump. In addition this is better for the system since in this way the frequency of activating the pump can be minimized.

For cleaning the system, the switching points used may be different from those used in the normal milking operation without requiring any more hardware to be mounted in the collecting vessel. Thus, for example optimized or optimal plugs may be formed for cleaning.

It is also conceivable to provide both for system cleaning and for the normal milking operation, activating or deactivating another pump or switching from star to delta operation of a pump in relation to the filling level since this allows employing a plurality of switching points.

FIG. 3 shows an equivalent circuit diagram of the measuring principle in cross-section. The first electrode 6 consists of a low-resistance high-grade steel bar immersed into the conductive liquid-gas mixture 28. Via the feed lines 10 and 11 the power supply 9 applies to the first electrode 6 a potential modulated at a higher frequency. The potential is measured between the first electrode 6 and the second electrode 7 by means of the measuring device 8. The measuring device is connected with the first electrode 6 via the line 12 and with the second electrode 7, via the line 19.

The mean equivalent resistance or impedances $RF_1$ and $RF_2$ of the liquid-gas mixture lie parallel to the immersed portion of the second electrode 7. The collected voltage is thus proportional to the density curve of the fluids.

Any and all features disclosed in the application documents are claimed as substantial to the invention as far as, taken individually or in combination, they are new over the prior art.

REFERENCE LIST

1 milk collecting device
2 milk collecting vessel
2*a* filling level
2*b* vacuum buffer
2*c* vessel wall
2*d* opening
3 measuring apparatus
4*a* inlet
4*b* outlet
5 measuring module
6 first electrode
6*a* connection point
6*b* connection point
7 second electrode
8 measuring device
9 power supply
10, 11, 12, 13 lines
20 rubber plug
14 opening
15 retaining device
16 cable connection
17 electrical connection line
18 recesses
19 line
21 line
22 connection
23 milk separator
25 milk pump
26 outlet
27 channel
28 liquid-gas mixture
$RF_1$, $RF_2$ mean equivalent impedances

The invention claimed is:

1. A milk collecting device comprising:
   a milk collecting vessel having at least one inlet and at least one controllable outlet;
   a measuring apparatus at least partially disposed in the milk collecting vessel, and comprising at least one first electrode and at least one second electrode spaced apart from the first electrode; and
   a measuring device for capturing at least one electrical parameter, the measuring device having a power supply connected with two spaced-apart connection points of the first electrode such that the power supply is connected in parallel relative to the first electrode, and connected with the second electrode via the measuring device to determine a measure characteristic of a filled quantity of a fluid mixture present in the milk collecting vessel.

2. The milk collecting device according to claim 1, and further comprising:
   at least one milk separator in fluid communication with the milk collecting vessel.

3. The milk collecting device according to claim 1, and further comprising:

a milk pump in fluid communication with the outlet of the milk collecting vessel.

4. The milk collecting device according to claim 3, wherein an outlet of the milk pump is in fluid communication with a bulk milk tank.

5. The milk collecting device according to claim 1, wherein the milk collecting vessel is provided in a vacuum section of a milking installation.

6. The milk collecting device according to claim 3, wherein the milk pump pumps subpressurized milk out of the milk collecting vessel and pumps the milk to normal pressure to convey the milk to a bulk milk tank.

7. The milk collecting device according to claim 1, wherein the milk collecting vessel is dimensioned to receive milk from more than one animal.

8. The milk collecting device according to claim 1, wherein a buffer volume is provided in the milk collecting vessel to enhance the steadiness of a milking vacuum.

9. The milk collecting device according to claim 1, wherein the measuring apparatus is elongated in shape.

10. The milk collecting device according to claim 1, wherein the electrodes extend in a longitudinal direction of the measuring apparatus and are substantially parallel to one another.

11. The milk collecting device according to claim 1, and further comprising:
a retainer to retain the electrodes at a predetermined distance from one another.

12. The milk collecting device according to claim 1, wherein the power supply is a voltage supply.

13. The milk collecting device according to claim 1, wherein at least one electrode extends above a height of the measuring apparatus.

14. The milk collecting device according to claim 1, and further comprising:
a processor in communication with the measuring device to determines a first quantity of fluid at a first predetermined time and at least one second quantity of fluid at a second time.

15. A measuring module for a milk collecting device of a milking installation, the measuring module comprising:
a measuring apparatus to determine a filled quantity of milk in the milk collecting device; and the measuring apparatus comprises:
a housing;
a retaining device;
at least one first electrode received in the retaining device;
a second electrode spaced apart from said first electrode and received in the retaining device; and
a measuring device for capturing at least one electrical parameter, the measuring device having a power supply connected with two spaced-apart connection points of the first electrode such that it is connected in parallel relative to the first electrode, and connected with the second electrode to determine a measure characteristic of the filled quantity of a liquid present in the milk collecting vessel.

16. The measuring module according to claim 15, wherein the retaining device is a rubber plug.

17. The measuring module according to claim 15, wherein at least one electrode comprises a substantially hollow rod.

18. The measuring module according to claim 15, wherein the first electrode comprises a substantially hollow rod and an associated electrical line is disposed in the interior of the hollow rod.

19. A milking installation for milking animals comprising:
a milk collecting device having:
a milk collecting vessel having at least one inlet and at least one controllable outlet;
a measuring apparatus comprising at least one first electrode and at least one second electrode spaced apart from said first electrode, and
a power supply electrically connected with both electrodes; and
a measuring device for capturing at least one electrical parameter; and
the power supply is connected with two spaced-apart connection points of the first electrode such that it is connected in parallel relative to the first electrode, and connected with the second electrode via the measuring device to determine a measure characteristic of a filled quantity of a liquid in the milk collecting vessel.

20. The milking installation according to claim 19, and further comprising:
a processor for time-controlling a milking operation in dependence on the measure characteristic of the filled quantity of liquid.

21. The milking installation according to claim 19, and further comprising:
a placing system that is at least partially automatic.

22. A method for controlling the operation of a milk collecting device having a measuring device and a milk collecting vessel, the method comprising the steps of:
conveying a liquid into the milk collecting vessel;
applying an electrical parameter to a first electrode that is at least partially immersed in the liquid;
capturing an electrical signal between the first electrode and a second electrode; and
evaluating the signal with a measuring device located between the first electrode and the second electrode, having a power supply connected with two spaced-apart connection points on the first electrode such that the power supply is connected in parallel relative to the first electrode and connected with the second electrode via the measuring device; and
deriving a characteristic measure of a filled quantity of a liquid present in the milk collecting vessel from the evaluation of the signal.

23. The method according to claim 22, and further comprising the step of:
controlling a milk pump in communication with an outlet of the milk collecting vessel based on a filled quantity of fluid in the milk collecting vessel.

24. The method according to claim 22, and further comprising the step of:
deriving a fluid flow per unit time.

25. The method according to claim 22, and further comprising the step of:
controlling a milk pump rotational speed in dependence on fluid flow based on a filled quantity of fluid in the milk collecting vessel.

26. The method according to claim 22, and further comprising the steps of:
controlling a milk pump based on a filled quantity of fluid in the milk collecting vessel; and
providing a buffer vacuum in the milk collecting vessel.

27. The method according to claim 26, wherein the step of providing a buffer vacuum comprises the step of:
maintaining a buffer vacuum of between 25% and 75% of the milk collecting vessel volume.

28. The method according to claim 22, and further comprising the step of:

incorporating an entering fluid flow with fluid in the milk collecting vessel to form one fluid quantity.

29. The method according to claim 22, and further comprising the step of:

emitting a signal to a refrigerating system based on the step of evaluating the electrical signal.

30. The method according to claim 22, and further comprising the step of:

controlling a milking process based on the step of evaluating the electrical signal.

31. The method according to claim 22, and further comprising the step of:

cleaning a milk pump by applying switching points that are different from switching points used during milking.

* * * * *

UNITED STATES PATENT AND TRADEMARK OFFICE
CERTIFICATE OF CORRECTION

| | |
|---|---|
| PATENT NO. | : 8,342,123 B2 |
| APPLICATION NO. | : 12/225452 |
| DATED | : January 1, 2013 |
| INVENTOR(S) | : Andreas Springer and Otto Krone |

It is certified that error appears in the above-identified patent and that said Letters Patent is hereby corrected as shown below:

In column 11, claim 14, line 38 should read: "determine a first quantity of fluid at a first..."

Signed and Sealed this
Fifth Day of March, 2013

Teresa Stanek Rea
*Acting Director of the United States Patent and Trademark Office*